(12) United States Patent
Nawaz et al.

(10) Patent No.: US 10,934,176 B2
(45) Date of Patent: Mar. 2, 2021

(54) METHODS OF DEGRADING ORGANIC POLLUTANTS AND PREVENTING OR TREATING MICROBE USING BI₂S₃-CDS PARTICLES

(71) Applicant: Imam Abdulrahman Bin Faisal University, Dammam (SA)

(72) Inventors: Muhammad Nawaz, Dammam (SA); Faiza Qureshi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 35 days.

(21) Appl. No.: 16/144,263

(22) Filed: Sep. 27, 2018

(65) Prior Publication Data

US 2020/0102228 A1    Apr. 2, 2020

(51) Int. Cl.
*C01G 29/00* (2006.01)
*A01N 59/16* (2006.01)
*B01J 27/04* (2006.01)
*B01J 35/00* (2006.01)
*C01G 11/02* (2006.01)

(52) U.S. Cl.
CPC ............ *C01G 29/00* (2013.01); *A01N 59/16* (2013.01); *B01J 27/04* (2013.01); *B01J 35/004* (2013.01); *C01G 11/02* (2013.01); *B01J 2523/28* (2013.01); *B01J 2523/54* (2013.01); *C01P 2002/72* (2013.01); *C01P 2002/84* (2013.01); *C01P 2004/03* (2013.01); *C01P 2004/32* (2013.01); *C01P 2004/61* (2013.01); *C01P 2004/62* (2013.01); *C01P 2006/12* (2013.01); *C01P 2006/14* (2013.01); *C01P 2006/16* (2013.01)

(58) Field of Classification Search
None
See application file for complete search history.

(56) References Cited

U.S. PATENT DOCUMENTS

2014/0377007 A1\* 12/2014 Charles .................. B32B 27/36
405/128.75

FOREIGN PATENT DOCUMENTS

| CN | 101866960 B | 12/2011 |
| CN | 103272617 A | 9/2013 |
| CN | 104549375 A | 4/2015 |

(Continued)

OTHER PUBLICATIONS

CN101947463 (English abstract) (Year: 2011).\*

(Continued)

*Primary Examiner* — Bethany P Barham
*Assistant Examiner* — Barbara S Frazier
(74) *Attorney, Agent, or Firm* — Oblon, McClelland, Maier & Neustadt, L.L.P.

(57) ABSTRACT

Methods of synthesizing Bi₂S₃—CdS particles in the form of spheres as well as properties of these Bi₂S₃—CdS particles are described. Methods of photocatalytic degradation of organic pollutants employing these Bi₂S₃—CdS particles and methods of preventing or reducing microbial growth on a surface by applying these Bi₂S₃—CdS particles in the form of a solution or an antimicrobial product onto the surface are also specified.

6 Claims, 6 Drawing Sheets

(56) References Cited

FOREIGN PATENT DOCUMENTS

CN 107282075 A 10/2017
CN 107519903 A 12/2017

OTHER PUBLICATIONS

CN108499589 (Machine translation) (Year: 2018).*
Yunhan Shi, et al., "One-pot controlled synthesis of sea-urchin shaped $Bi_2S_3$/CdS hierarchical heterostructures with excellent visible light photocatalytic activity", Dalton Transactions, vol. 43, Issue 32, Jun. 23, 2014, pp. 12396-12404 (Abstract only).
Fengjuan Chen, et al., "Facile synthesis of $Bi_2S_3$ hierarchical nanostructure with enhanced photocatalytic activity", Journal of Colloid and Interface Science, vol. 404, Aug. 15, 2013, pp. 110-116 (Abstract only).
Pin LV, et al., "Simple synthesis method of $Bi_2S_3$/CdS quantum dots cosensitized $TiO_2$ nanotubes array with enhanced photoelectrochemical and photocatalytic activity", Crystengcomm, RSC Publishing, vol. 15, Issue 37, 2013, pp. 7548-7555.

* cited by examiner

METHODS OF DEGRADING ORGANIC POLLUTANTS AND PREVENTING OR TREATING MICROBE USING BI$_2$S$_3$-CDS PARTICLES

BACKGROUND OF THE INVENTION

Technical Field

The present invention relates to Bi$_2$S$_3$—CdS particles in the form of spheres, a method of preparing the Bi$_2$S$_3$—CdS particles, and methods of employing these Bi$_2$S$_3$—CdS particles for photocatalytically degrading organic pollutants and for killing or inhibiting growth of microorganisms.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Organic pollutants including dyes produced by the textile, printing, and paper industries and during experimental uses may end up in wastewaters and pose a potential threat to the environment because of their carcinogenic nature. For example, methyl orange, which is a frequently used azo dye, is considered mutagenic. Purification methods such as chemical precipitation and flocculation, and absorption have been developed fir removing organic pollutants from wastewater. Photocatalytic degradation is a viable alternative for removing organic pollutants. Unlike physical processes such as adsorption, which simply relocate the organic pollutant from wastewater to the adsorbent and cause secondary contamination, photocatalytic degradation is a more effective strategy which can break down the organic pollutants on a molecular level and form carbon dioxide, water, and other less toxic molecules. It is advantageous to develop nanomaterials exhibiting good photocatalytic degradation capabilities of organic pollutants.

The unique outer membrane of gram-negative bacteria protects them from many antibiotics including penicillin, which leads to medical challenges in treating infections caused by these bacteria. For example, *Klebsiella* organisms, which are gram-negative bacteria often resistant to multiple antibiotics, have become important pathogens in nosocomial infections. Common conditions caused by *Klebsiella* bacteria include pneumonia, infections in the urinary tract, lower biliary tract, and surgical wound sites. Bacterial drug resistance may stem from the build-up of antibiotics in the environment. Over usage and unnecessary prescriptions of antibacterial drugs as well as capability of bacteria to adapt and evolve rapidly have contributed to the occurrence of antibiotic resistance. Antibiotic-resistant pathogens have already caused millions of illnesses and tens of thousands of deaths worldwide. *Staphylococcus aureus* (*S. aureus*) is one of the most common causes of bacteremia, infective endocarditis, bone and joint infections including infections from joint replacement surgeries, medical implant infections, various skin and soft-tissue infections, animal infections, and food poisoning. In addition, the emergence of antibiotic-resistant strains of *S. aureus* such as methicillin-resistant *S. aureus* (MRSA) is a worldwide problem in clinical medicine. Despite much research and development, no vaccine for *S. aureus* has been approved. It is beneficial to develop alternative nanomaterials possessing broad spectrum antimicrobial activities that are effective on both gram-positive and gram-negative bacterial strains.

In view of the forgoing, one objective of the present disclosure is to provide a method of photodegrading organic pollutants employing Bi$_2$S$_3$—CdS particles. A second objective of the present disclosure is to provide a method of preventing or reducing microbial growth on a surface by applying Bi$_2$S$_3$—CdS particles to the surface. A further objective of the present disclosure is to provide a method of preparing Bi$_2$S$_3$—CdS particles.

BRIEF SUMMARY OF THE INVENTION

According to a first aspect, the present disclosure relates to a method for degrading an organic pollutant. The method involves (i) contacting Bi$_2$S$_3$—CdS particles with an aqueous solution comprising the organic pollutant to form a mixture, and (ii) illuminating the mixture with a light at a wavelength in a range of 200-700 nm for 0.1-6 hours thereby degrading the organic pollutant, wherein the Bi$_2$S$_3$—CdS particles comprise bismuth(III) sulfide and cadmium(II) sulfide, the Bi$_2$S$_3$—CdS particles are in the form of spheres, and the organic pollutant is present in the aqueous solution at a concentration of 1-1,000 mg/L relative to a total volume of the aqueous solution.

In one embodiment, an atomic ratio of bismuth to cadmium in the Bi$_2$S$_3$—CdS particles is in a range of 0.5:1 to 4:1, and an atomic ratio of sulfur to bismuth in the Bi$_2$S$_3$—CdS particles is in a range of 3:2 to 8:1.

In one embodiment, the Bi$_2$S$_3$—CdS particles are in the form of spheres with an average diameter of 0.3-5 μm.

In one embodiment, the Bi$_2$S$_3$—CdS particles have a BET surface area of 5-25 m$^2$/g, a pore size of 10-50 nm, and a pore volume of 0.02-0.2 cm$^3$/g.

In one embodiment, an amount of the Bi$_2$S$_3$—CdS particles in the mixture is in a range of 0.1-10 g/L relative to a total volume of the mixture.

In one embodiment, at least 30% of the organic pollutant is degraded within 2 hours of illuminating.

In one embodiment, the organic pollutant comprises methyl orange, methyl green, or both.

According to a second aspect, the present disclosure relates to a method for preventing or reducing growth of a microorganism on a surface. The method involves applying Bi$_2$S$_3$—CdS particles onto the surface, wherein the Bi$_2$S$_3$—CdS particles comprise bismuth(III) sulfide and cadmium (II) sulfide, the Bi$_2$S$_3$—CdS particles are in the form of spheres, and the Bi$_2$S$_3$—CdS particles are in contact with the surface for 1-24 hours.

In one embodiment, an atomic ratio of bismuth to cadmium in the Bi$_2$S$_3$—CdS particles is in a range of 0.5:1 to 4:1, and an atomic ratio of sulfur to bismuth in the Bi$_2$S$_3$—CdS particles is in a range of 3:2 to 8:1.

In one embodiment, the Bi$_2$S$_3$—CdS particles have a BET surface area of 5-25 m$^2$/g, a pore size of 10-50 nm, and a pore volume of 0.02-0.2 cm$^3$/g.

In one embodiment, the Bi$_2$S$_3$—CdS particles are applied onto the surface as a solution comprising a solvent and 1 μg/mL to 50 mg/mL of the Bi$_2$S$_3$—CdS particles relative to a total volume of the solution.

In one embodiment, the solvent comprises dimethyl sulfoxide and water.

In one embodiment, the Bi$_2$S$_3$—CdS particles are applied onto the skin of a subject as an antimicrobial cream comprising 0.01 wt %-50 wt % of the Bi$_2$S$_3$—CdS particles relative to a total weight of the antimicrobial cream.

In one embodiment, the microorganism is at least one gram-negative bacterium selected from the group consisting of *Acinetobacter baumannii*, *Enterobacter aerogenes*, *Escherchia coli*, *Klebsiella oxytoca* and *Klebsiella pneumoniae*.

In one embodiment, the microorganism is at least one gram-positive bacterium selected from the group consisting of *Staphylococcus aureus*, *Staphylococcus epidermis*, and MRSA.

According to a third aspect, the present disclosure relates to $Bi_2S_3$—CdS particles comprising bismuth(III) sulfide, and cadmium(II) sulfide, wherein the $Bi_2S_3$—CdS particles are in the form of spheres with an average diameter of 03-5 μm.

According to a fourth aspect, the present disclosure relates to a method of preparing the $Bi_2S_3$—CdS particles of the third aspect. The method involves (i) mixing a bismuth(III) salt, a cadmium(II) salt, and an optionally substituted thiourea with a solvent in the presence of polyvinylpyrrolidone to form a reaction mixture, and (ii) heating the reaction mixture in an autoclave at a temperature of 100-300° C. for 2-48 hours, thereby forming the $Bi_2S_3$—CdS particles.

In one embodiment, an atomic ratio of bismuth to cadmium in the reaction mixture is in a range of 0.5:1 to 4:1.

In one embodiment, a molar ratio of the optionally substituted thiourea to the bismuth(III) salt is in a range of 2:1 to 10:1.

In one embodiment, the optionally substituted thiourea is thiourea of formula $SC(NH_2)_2$.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
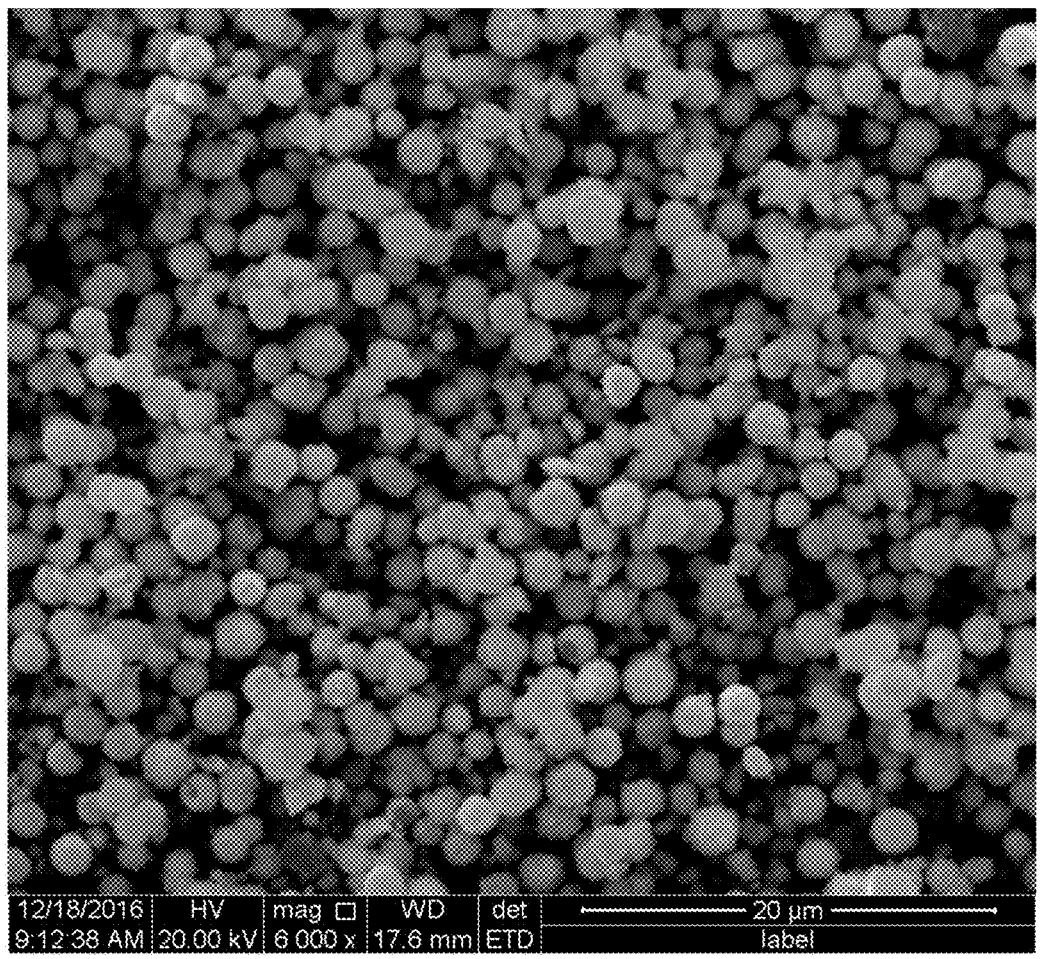
FIG. 1A is a scanning electron microscopy (SEM) image of $Bi_2S_3$—CdS nanospheres.

Embodiments of the present disclosure will now be described more fully hereinafter with reference to the accompanying drawings, in which some, but, not all embodiments of the disclosure are shown.

The present disclosure will be better understood with reference to the following definitions.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, the terms "compound" and "product" are used interchangeably, and are intended to refer to a chemical entity, whether in the solid, liquid or gaseous phase, and whether in a crude mixture or purified and isolated.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, and isotopes of sulfur include $^{33}S$, $^{34}S$, and $^{36}S$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

A particle is defined as a small object that behaves as a whole unit with respect to its transport and properties. The $Bi_2S_3$—CdS particles of the present disclosure in any of their embodiments may be in the form of particles of the same shape or different shapes, and of the same size or different sizes. An average diameter (e.g., average particle size) of the particle, as used herein, refers to the average linear distance measured from one point on the particle through the center of the particle to a point directly across from it. Microparticles are particles having an average diameter between 0.1 and 100 μm in size. Nanoparticles are particles having an average diameter between 1 and 100 nm in size.

A first aspect of the present disclosure relates to $Bi_2S_3$—CdS particles comprising bismuth(III) sulfide, and cadmium (II) sulfide. Most preferably, the $Bi_2S_3$—CdS particles are in the form of spheres. Preferably, the $Bi_2S_3$—CdS particles may be substantially spherical having oval or oblong shape. In one or more embodiments, the $Bi_2S_3$—CdS particles of the present disclosure may be uniform. As used herein, the term "uniform" refers to no more than 10%, preferably no more than 5%, preferably no more than 4%, preferably no more than 3%, preferably no more than 2%, preferably no more than 1% of the distribution of the $Bi_2S_3$—CdS particles having a different shape. For example, the $Bi_2S_3$—CdS particles are uniform and have no more than 1% of the particles in a substantially cylinder or rectangle shape. In certain embodiments, the $Bi_2S_3$—CdS particles may be non-uniform. As used herein, the term "non-uniform" refers to more than 10% of the distribution of the $Bi_2S_3$—CdS particles having a different shape. In certain embodiments, the $Bi_2S_3$—CdS particles may comprise additional shapes that provide desired photocatalytic and/or antimicrobial activity including, but not limited to, a flake, a rod, a cylinder, a rectangle, a triangle, a pentagon, a hexagon, a prism, a disk, a platelet, a cube, a cuboid, and an urchin (e.g. a globular particle possessing a spiky uneven surface). In one or more embodiments, the $Bi_2S_3$—CdS particles have an average diameter of 0.3-5 µm, 0.4-4 µm, 0.5-3 µm, 0.6-2 µm, 0.7-1.5 µm, or 0.8-1 µm. In a preferred embodiment, the $Bi_2S_3$—CdS particles are in the form of spheres having an average diameter of 0.3-5 µm, 0.4-4 µm, 0.5-3 µm, 0.6-2 µm, 0.7-1.5 µm, or 0.8-1 µm.

Figure 1B:
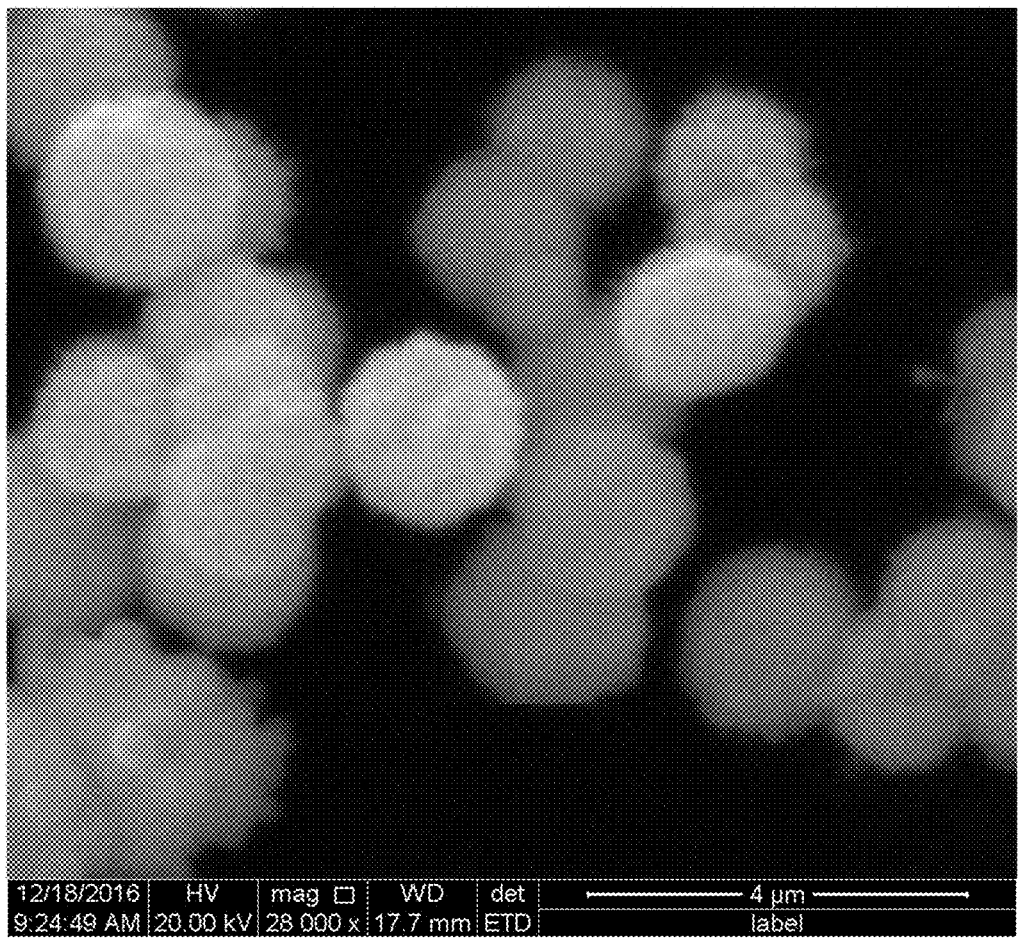
FIG. 1B is a high magnification SEM image of $Bi_2S_3$—CdS nanospheres.
Figure 2:
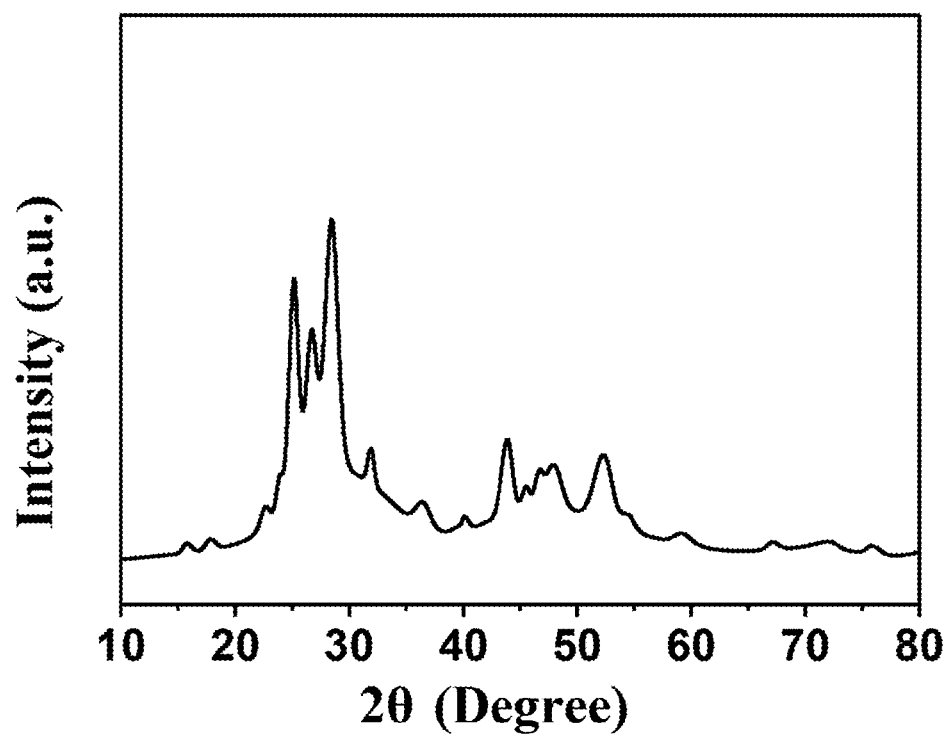
FIG. 2 is an X-ray diffraction (XRD) pattern of $Bi_2S_3$—CdS nanospheres.
Figure 3:
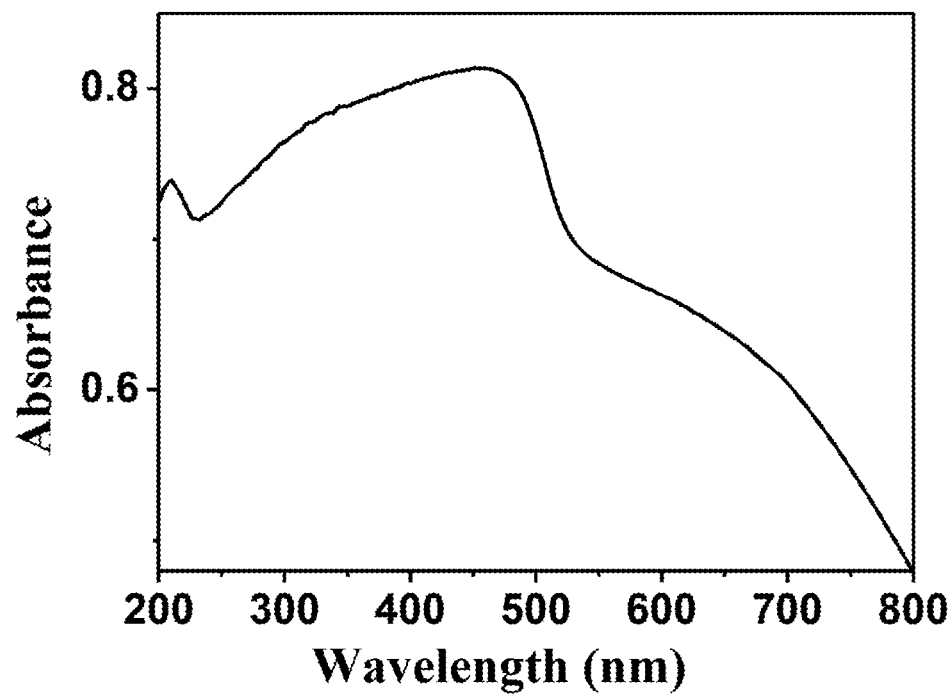
FIG. 3 is a UV-vis diffuse reflectance spectrum of $Bi_2S_3$—CdS nanospheres.

As defined herein, "surface roughness" refers to a component of surface texture. It may be quantified by the deviations in the direction of the normal vector of a real surface from its ideal form. In surface metrology, roughness is typically considered to be the high-frequency, short-wavelength component of the measured surface. In one embodiment, the $Bi_2S_3$—CdS particles of the present disclosure are in the form of spheres having an uneven surface (see FIGS. 1A and 1B). The uneven surface may have an irregular contour that is bumpy, jagged, spiky, serrated, or zigzag. In a preferred embodiment, the $Bi_2S_3$—CdS particles have a surface roughness in a range from 0.05-50 nm, 0.1-25 nm, 0.5-10 nm, or 1-5 nm.

As used herein, "dispersity" is a measure of the heterogeneity of sizes of molecules or particles in a mixture. In probability theory or statistics, the coefficient of variation (CV), also known as relative standard deviation (RSD) is a standardized measure of dispersion of a probability distribution. It is expressed as a percentage and may be defined as the ratio of the standard deviation ($\sigma$) to the mean ($\mu$, or its absolute value $|\mu|$). The coefficient of variation or relative standard deviation is widely used to express precision and/or repeatability. It may show the extent of variability in relation to the mean of a population. In a preferred embodiment, the $Bi_2S_3$—CdS particles of the present disclosure have a narrow size dispersion, i.e. monodispersity. As used herein, "monodisperse", "monodispersed", and/or "monodispersity" refers to $Bi_2S_3$—CdS particles which have a CV or RSD of less than 30%, preferably less than 25%, preferably less than 20%, preferably less than 15%, preferably less than 12%, preferably less than 10%, preferably less than 8%, preferably less than 5%.

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In most embodiments, pore volume and BET surface area are measured by gas adsorption analysis, preferably $N_2$ adsorption analysis. In one or more embodiments, the $Bi_2S_3$—CdS particles of the present disclosure have a BET surface area in a range of 1-50 m$^2$/g, preferably 2-40 m$^2$/g, preferably 4-30 m$^2$/g, preferably 6-25 m$^2$/g, preferably 8-20 m$^2$/g, preferably 10-18 m$^2$/g, preferably 11-16 m$^2$/g, preferably 12-14 m$^2$/g. In one or more embodiments, the $Bi_2S_3$—CdS particles of the present disclosure have a pore volume of 0.02-0.4 cm$^3$/g, 0.03-0.2 cm$^3$/g, 0.04-0.1 cm$^3$/g, or 0.06-0.08 cm$^3$/g.

The $Bi_2S_3$—CdS particles may be macroporous, mesoporous, or microporous. The term "microporous" means the pores of the particles have an average pore size of less than 2 nm. The term "mesoporous" means the pores of the particles have an average pore size of 2-50 nm. The term "macroporous" means the pores of the particles have an average pore size larger than 50 nm. In one or more embodiments, the $Bi_2S_3$—CdS particles are mesoporous, and have an average pore size in a range of 4-50 nm, 6-40 nm, 8-30 nm, 10-25 nm, or 15-20 nm. In another embodiment, the $Bi_2S_3$—CdS particles have an average pore size in a range of 51-100 nm, 60-90 nm, or 70-80 nm.

As used herein, bismuth (III) sulfide ($Bi_2S_3$) is a chemical compound of bismuth and sulfur. It occurs in nature as the mineral bismuthinite. Bismuth (III) sulfide can be prepared by reacting a bismuth (III) salt with hydrogen sulfide and bismuth (III) sulfide can also be prepared by the reaction of elemental bismuth and elemental sulfur in an evacuated silica tube at elevated temperatures (~500° C.) for an extended period of time (~96 hours). Bismuth (III) sulfide is isostructural with $Sb_2S_3$, stibnite, consisting of linked ribbons. Bismuth atoms are in two different environments, both of which have 7 coordinate bismuth atoms, 4 in a near planar rectangle and three more distant making an irregular 7-coordination group.

As used herein, cadmium(II) sulfide is the inorganic compound with the formula CdS. It occurs in nature with two different crystal structures as the rare minerals greenockite and hawleyite. As a compound that is easy to isolate and purify, cadmium(II) sulfide is the principal source of cadmium for commercial applications. Cadmium (II) sulfide can be prepared by the precipitation from soluble cadmium(II) salts with sulfide ions. Cadmium(II) sulfide has two crystal forms. The more stable hexagonal wurtzite structure (found in the mineral Greenockite) and the cubic zinc blende structure (found in the mineral Hawleyite). In both of these forms the cadmium and sulfur atoms are tetra-coordinated.

In a preferred embodiment, the $Bi_2S_3$—CdS particles have an atomic ratio of bismuth to cadmium in a range of 0.5:1 to 4:1, preferably 0.75:1 to 3.5:1, preferably 1:1 to 3:1, preferably 1.25:1 to 2.5:1, preferably 1.5:1 to 2.25:1, or about 2:1. In a preferred embodiment, the $Bi_2S_3$—CdS particles have an atomic ratio of sulfur to bismuth in a range of 3:2 to 8:1, preferably 1.6:1 to 6:1, preferably 1.7:1 to 4:1, preferably 1.75:1 to 3:1, or about 2:1. In a preferred embodiment, the $Bi_2S_3$—CdS particles have an atomic ratio of sulfur to cadmium in a range of 2:1 to16:1, preferably 2.5:1 to 12:1, preferably 3:1 to 8:1, preferably 3.5:1 to 6:1, or about 4:1. In a preferred embodiment, the $Bi_2S_3$—CdS particles have a molar ratio of bismuth (III) sulfide to cadmium(II) sulfide in a range of 1:8 to 8:1, preferably 1:6 to 6:1, preferably 1:5 to 5:1, preferably 1:4 to 4:1, preferably 1:3 to 3:1, preferably 1:2 to preferably 1:1.2 to 1.2:1, or about 1:1.

In certain embodiments, the bismuth (III) sulfide ($Bi_2S_3$) and the cadmium(II) sulfide (CdS) may be homogeneously dispersed to &ilia the $Bi_2S_3$—CdS particles. In certain embodiments, the $Bi_2S_3$ and CdS may form one or more layers of each other throughout the $Bi_2S_3$—CdS particles. In certain embodiments, the $Bi_2S_3$ may form a shell around a core of CdS in the $Bi_2S_3$—CdS particles. Alternatively, the CdS may form a shell around a core of $Bi_2S_3$ in the $Bi_2S_3$—CdS particles. In a preferred embodiment, the $Bi_3S_3$ is affixed to one or more surfaces of the CdS in the $Bi_2S_3$—CdS particles. These materials may be affixed in any reasonable manner, such as physisorption or chemisorption and mixtures thereof via strong atomic bonds (e.g. ionic, metallic, and covalent bonds) and/or weak interactions such as van der Waals, or hydrogen bonds. In certain embodiments, the $Bi_2S_3$—CdS particles comprise $Bi_2S_3$ and/or CdS incorporated into the lattice structure of the CdS and/or $Bi_2S_3$. For example, the elemental $Bi_2S_3$ may be embedded, between CdS molecules to become integral with the lattice. Alternatively, the $Bi_2S_3$ may be embedded into the pores of the CdS lattice and thus not integral to the CdS lattice. In certain alternative embodiments, the $Bi_2S_3$ and/or CdS is not incorporated into the lattice structure of CdS and/or $Bi_2S_3$ and may be adsorbed on the surface (e.g. by van der Waals and/or electrostatic forces) of the CdS and/or $Bi_2S_3$.

Another aspect of the present disclosure relates to a method of preparing the $Bi_2S_3$—CdS particles. The method involves (i) mixing a bismuth(III) salt, a cadmium(II) salt, and an optionally substituted thiourea in a solvent in the presence of polyvinylpyrrolidone to form a reaction mixture, and (ii) heating the reaction mixture in an autoclave at a temperature of 100-300° C. for 2-48 hours, thereby forming the $Bi_2S_3$—CdS particles.

As used herein, the term "solvent" includes, but is not limited to, water (e.g. tap water, distilled water, deionized water, deionized distilled water), organic solvents, such as ethers (e.g. diethyl ether, tetrahydrofuran, 1,4-dioxane, tetrahydropyran, t-butyl methyl ether, cyclopentyl methyl ether, di-iso-propyl ether), glycol ethers (e.g. 1,2-dimethoxyethane, diglymer, triglyme), alcohols (e.g. methanol, ethanol, trifluoroethanol, n-propanol, propanol, n-butanol, i-butanol, t-butanol, n-pentanol, i-pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol), aromatic solvents (e.g. benzene, o-xylene, m-xylene, p-xylene, mixtures of xylenes, toluene, mesitylene, anisole, 1,2-dimethoxybenzene, α,α,α-trifluoromethylbenzene, fluorobenzene), chlorinated solvents (e.g. chlorobenzene, dichloromethane, 1,2-dichloroethane, 1,1-dichloroethane, chloroform), ester solvents (e.g. ethyl acetate, propyl acetate), urea solvents, ketones (e.g. acetone, butanone), acetonitrile, propionitrile, butyronitrile, benzonitrile, dimethyl sulfoxide, ethylene carbonate, propylene carbonate, 1,3-dimethyl-3,4,5,6-tetrahydro-2(1H)-pyrimidinone, and mixtures thereof. As used herein solvent may refer to non-polar solvents (e.g. hexane, benzene, toluene, diethyl ether, chloroform, 1,4-dioxane), polar aprotic solvents (e.g. ethyl acetate, tetrahydrofuran, dichloromethane, acetone, acetonitrile, dimethylformamide, dimethyl sulfoxide), and polar protic solvents (e.g. acetic acid, n-butanol, isopropanol, n-propanol, ethanol, methanol, ethylene glycol, diethylene glycol, triethylene glycol, formic acid, water), and mixtures thereof. In a preferred embodiment, the solvent used herein is a polar protic solvent, preferably a diol (e.g. ethylene glycol, diethylene glycol, triethylene glycol). Most preferably the solvent is ethylene glycol.

As used herein, a salt refers to an ionic compound resulting from the neutralization reaction of an acid and a base. Salts are composed of related numbers of cation (positively charged ions) and anions (negatively charged ions) such that the product is electrically neutral (without a net charge). These component ions may be inorganic (e.g. chloride, $Cl^-$) or organic (e.g. acetate, $CH_3CO_2^-$) and may be monoatomic (e.g. fluoride, $F^-$) or polyatomic (e.g. sulfate, $SO_4^{2-}$). Exemplary conventional salts include, but are not limited to, those derived from inorganic acids including, but not limited to, hydrochloric, hydrobromic, sulfuric, sulfamic, phosphoric, and nitric; and those derived from organic acids including, but not limited to, acetic, propionic, succinic, glycolic, stearic, lactic, malic, tartaric, citric, ascorbic, pamoic, maleic, hydroxymaleic, phenylacetic, glutamic, benzoic, salicyclic, sulfanilic, 2-acetoxybenzoic, fumaric, toluenesulfonic, methanesulfonic, ethane disulfonic, oxalic, isethionic, and mixtures and hydrates thereof and the like. The present disclosure includes all hydration states of a given salt or formula, unless otherwise noted. For example, $Bi(NO_3)_3$ includes anhydrous $Bi(NO_3)_3$, pentahydrate $Bi(NO_3)_3.5H_2O$, and any other hydrated forms or mixtures. $Cd(NO_3)_2$ includes anhydrous $Cd(NO_3)_2$, tetrahydrate $Cd(NO_3)_2.4H_2O$, and any other hydrated forms or mixtures.

In one or more embodiments, an atomic ratio of bismuth to cadmium in the reaction mixture is in a range of 0.5:1 to 4:1, preferably 1:1 to 3.5:1, preferably 1.5:1 to 3:1, or about 2:1. However, in certain embodiments, the atomic ratio of bismuth to cadmium in the reaction mixture may be less than 0.5:1 or greater than 4:1.

Exemplary suitable bismuth(III) salts include, but are not limited to, bismuth(III) nitrate, bismuth (iii) nitrate pentahydrate, bismuth (III) bromide, bismuth (III) chloride, bismuth (III) fluoride, bismuth (III) iodide, bismuth (III) oxychloride. In a preferred embodiment, the bismuth(III) salt is bismuth(III) nitrate, $Bi(NO_3)_3$, bismuth(III) nitrate pentahydrate $Bi(NO_3)_3.5H_2O$, or a mixture thereof. In one or more embodiments, when present, the concentration of the bismuth nitrate in the reaction mixture is in a range of 1-1,000 mM, preferably 5-750 mM, preferably 10-500 mM, preferably 15-250 mM, preferably 20-100 mM, or about 25 mM.

Exemplary suitable cadmium(II) salts include, but are not limited to, cadmium(II) nitrate, cadmium(II) nitrate tetrahydrate, cadmium(II) chloride, cadmium(II) bromide, cadmium(II) iodide, cadmium(II) acetate, and cadmium(II) carbonate. In a preferred embodiment, the cadmium(II) salt is cadmium(II) nitrate, cadmium(II) nitrate tetrahydrate, $Cd(NO_3)_2.4H_2O$, or a mixture thereof. In one or more embodiments, when present, the concentration of cadmium (II) nitrate in the reaction mixture is in a range of 2-2,000 mM, preferably 10-1,500 mM, preferably 20-1,000 mM, preferably 30-500 mM, preferably 40-200 mM, or about 50 mM.

As used herein, an optionally substituted thiourea refers to a broad class of compounds with the general structure $(R^1R^2N)(R^3R^4N)C=S$ wherein $R^1$, $R^2$, $R^3$, and $R^4$ are each independently a hydrogen, an optionally substituted alkyl, an optionally substituted cycloalkyl, an optionally substituted cycloalkylalkyl, an optionally substituted arylalkyl, an optionally substituted alkenyl, an optionally substituted heteroaryl, an optionally substituted aryl, an optionally substituted heterocyclyl, an optionally substituted aryl olefin, or an optionally substituted vinyl. As used herein, the term "substituted" refers to at least one hydrogen atom that is replaced with a non-hydrogen group, provided that normal valencies are maintained and that the substitution results in a stable compound.

Exemplary suitable optionally substituted thiourea compounds include, but are not limited to, thiourea $(NH_2CSNH_2)$, 1,3-diisopropyl-2-thiourea, 1,3-di-p-tolyl-2-thiourea, 1-(2-methoxyphenyl)-2-thiourea, propylene thiourea, 1-(4-nitrophenyl)-2-thiourea, 1-(3-nitrophenyl)-2-thiourea, N-Boc-thiourea, (2,3-difluorophenyl)thiourea, (3,5-dimethylphenyl)thiourea, (4-cyanophenyl)thiourea, (4-fluorophenyl)thiourea, 1-(3-carboxyphenyl)-2-thiourea, (2,5-difluorophenyl)thiourea, (3-fluorophenyl)thiourea, (2,4-difluorophenyl)thiourea, (2,6-difluorophenyl)thiourea, (2-fluorophenyl)thiourea, (4-acetylphenyl)thiourea, 1-(2,3-dichlorophenyl)-2-thiourea, 1-(2-bromophenyl)-2-thiourea, 1-(2-ethylphenyl)-2-thiourea, 1-(2-furfuryl)-2-thiourea, 1-(2-tetrahydrofurfuryl)-2-thiourea, 1-(3,4-methylenedioxyphenyl)-2-thiourea, 1-(3-acetylphenyl)-2-thiourea, 1-(3-bromophenyl)-2-thiourea, 1-(3-cyanophenyl)-2-thiourea, 1-(3-ethoxycarbonylphenyl)-2-thiourea, 1-(3-methoxybenzyl)-2-thiourea, 1-(3-phenylpropyl)-2-thiourea, 1-(4-chlorophenyl)-2-thiourea, 1-(4-ethoxycarbonylphenyl)-2-thiourea, N-(2,4,6-trichlorophenyl)thiourea, N-(3,5-dichlorophenyl)thiourea, N-(4-phenoxyphenyl)thiourea, N-(4-pyridyl)thiourea, N-(6-quinolinyl)thiourea, N-(8-quinolinyl)thiourea, N,N'-di-Boc-thiourea, [3-(trifluoromethyl)phenyl]thiourea, 1-cyclohexyl-3-(2-morpholinoethyl)-2-thiourea, [4-(trifluoromethyl)phenyl]thiourea, 1,3-bis[3,5-bis(trifluoromethyl)phenyl]thiourea, 1-[4-(dimethylamino)phenyl]-2-thiourea, 1-(1,3-diphenyl-1H-pyrazol-5-yl)thiourea, 1-(3-chloro-4-fluorophenyl)thiourea, 1-(4-(4-bromophenoxy)phenyl)thiourea, 1-(4-(4-chlorophenoxy)phenyl)thiourea, 1-(4-(4-fluorophenoxy)phenyl)thiourea, 1-(4-(4-methoxyphenoxy)phenyl)thiourea, 1-(4(p-tolyloxy)phenyl)thiourea, 1-(4-chlorophenyl-3-[2-phenylacetyl)amino]thiourea, 1-(5-chloro-2-(trifluoromethyl)phenyl)thiourea, 1-benzyl-3-(2,6-dimethylphenyl)thiourea, 1-benzyl-3-(2-ethoxyphenyl)thiourea, 1-benzyl-3-(4-methoxyphenyl)thiourea, 1-benzyl-3-(naphthalen-1-yl)thiourea, 1-ethyl-3-(2-methoxyphenyl)thiourea, 1-ethyl-3-(4-fluorophenyl)thiourea, [4-bromo-2-(trifluoromethyl)phenyl]thiourea, N-[2-(trifluoromethyl)phenyl]thiourea, N-(1,3-dimethyl-1H-pyrazol-5-yl)thiourea, N-(1H-1,3-benzimidazol-5-yl)thiourea, N-(1H-indazol-5-yl)thiourea, N-(1H-indazol-6-yl)thiourea, N-(1H-indazol-7-yl)thiourea, N-phenylthiourea, N-(1-naphthyl)thiourea, N-allylthiourea, N,N'-diphenylthiourea, 1,1,3-triphenyl-2-thiourea, 1,3-di-tert-butyl-2-thiourea, 1,3-diallyl-2-thiourea, 1,3-dibenzyl-2-thiourea, 1,3-dicyclohexyl-2-thiourea, 1,3-difurfuryl-2-thiourea, 1,3-diheptyl-2-thiourea, 1,3-dihexadecyl-2-thiourea, 1,3-dihexyl-2-thiourea, 1,3-dioctyl-2-thiourea, 1,3-dipropyl-2-thiourea, 1-(2,4,6-tribromophenyl)-2-thiourea, 1-(2,4-dichlorophenyl)-2-thiourea, 1-(2,6-xylyl-2-thiourea, 1-(3,4-dimethoxyphenyl)-2-thiourea, 1-(3-chlorophenyl)-2-thiourea, 1-(3-methoxypropyl)-2-thiourea, 1-benzyl-2-thiourea, 1-butyl-2-thiourea, 1-dodecanoyl-2-thiourea, N-(2,4-dimethylphenyl)thiourea, N-(2,5-dichlorophenyl)thiourea, N-(2,6-dichlorophenyl)thiourea, N-(2-phenylethyl)thiourea, N-(3,4-dichlorophenyl)thiourea, N-(3,4-dimethylphenyl)thiourea, N-(3-methoxyphenyl)thiourea, N-(4-bromophenyl)thiourea, N-(4-chlorophenyl)thiourea, N-(4-ethoxyphenyl)thiourea, N-(4-ethylphenyl)thiourea, N-(4-methoxyphenyl)thiourea, N-(4-methylphenyl)thiourea, N-(tert-butyl)thiourea, (2,3-dimethyl-phenyl)thiourea, (2,4,6-trimethyl-phenyl)thiourea, (3,4,5-trimethoxy-phenyl)thiourea, (4-ethoxy-phenyl)thiourea, (phenyl-phenyliminomethyl)thiourea, and the like.

In a preferred embodiment, the optionally substituted thiourea is thiourea of formula $SC(NH_2)_2$, where $R^1=R^2=R^3=R^4=-H$. Thiourea is an organosulfur compound that is structurally similar to urea, except that the oxygen atom is replaced by a sulfur atom, but the properties of urea and thiourea differ. Thiourea is a reagent in organic synthesis, which is commonly employed as a source of sulfide, often with reactions proceeding via the intermediacy of isothiuronium salts with the reaction capitalizing on the high nucleophilicity of the sulfur center and easy hydrolysis of the intermediate isothiouronium salt.

In one or more embodiments, the concentration of the optionally substituted thiourea in the reaction mixture is in a range of 0.01-1 M, preferably 0.05-0.75 M, preferably 0.1-0.5 M, preferably 0.15-0.25 M. In a preferred embodiment, a molar ratio of the optionally substituted thiourea to the bismuth(III) salt is in a range of 2:1 to 10:1, preferably 3:1 to 9:1, preferably 4:1 to 8:1, preferably 5:1 to 7:1, or about 6:1. In a preferred embodiment, the molar ratio of the optionally substituted thiourea to the cadmium(II) salt is in a range of 1:2 to 6:1, preferably 1:1 to 5:1, preferably 2:1 to 4:1, or about 3:1.

As used herein, polyvinylpyrrolidone (PVP), also commonly known as polyvidone or povidone, refers to a water soluble polymer obtainable from the monomer N-vinylpyrrolidone. In certain embodiments polyvinyl pyrrolidone may refer to cross-linked derivatives, a highly cross-linked modification of polyvinyl pyrrolidone (PVP) known as polyvinylpolypyrrolidone (PVPP, crospovidone, crospolividone, or E1202). PVP binds to polar molecules exceptionally well, owing to its polarity. PVP is soluble in water and other polar solvents including alcohols (e.g. methanol and ethanol) as well as more exotic solvents (e.g. deep eutectic solvent and urea). In solution, PVP has excellent wetting properties and readily forms films.

PVP polymers are available in several viscosity grades, ranging from low to high molecular weight and may be supplied in various viscosity grades as a powder and/or aqueous solution. Exemplary suitable commercial grades of polyvinylpyrrolidone include, but are not limited to, PVP K-12, PVP K-15, PVP K-30, PVP K-60, PVP K-90, and PVP K-120. The K-value assigned to various grades of PVP polymer may represent a function of the average molecular weight, the degree of polymerization, and the intrinsic viscosity. The K-values may be derived from viscosity measurements and calculated according to Fikentscher's formula. In a preferred embodiment, the polyvinyl pyrrolidone has a K-value in a range of 8-140, preferably 10-100, preferably 15-80, preferably 20-60, preferably 25-40.

Some of the techniques for measuring the molecular weight of various PVP polymer products are based on measuring sedimentation, light scattering, osmometry, NMR spectroscopy, ebulliometry, and size exclusion chromatography for determining absolute molecular weight distribution. By the use of these methods, any one of three molecular weight parameters can be measured, namely the number average (Mn), viscosity average (Mv), and weight average (Mw) molecular weights. As used herein, the mass average molar mass or weight average molar mass (Mw) describes the molar mass of a polymer with some properties dependent on molecular size, so a larger molecule will have a larger contribution than a smaller molecule. In some embodiments, the polyvinylpyrrolidone used herein has a weight average molar mass (Mw) in a range of 10,000-400,000 g/mol, preferably 12,000-360,000 g/mol, preferably 15,000-300,000 g/mol, preferably 20,000-200,000 g/mol, preferably 30,000-100,000 g/mol, preferably 40,000-90,000 g/mol, preferably 50,000-80,000 g/mol, preferably 60,000-70,000 g/mol.

As used herein, the polydispersity index (PDI or heterogeneity index) is a measure of the distribution of molecular mass in a given polymer sample. The PDI is calculated as the weight average molecular weight divided by the number average molecular weight. Typically, dispersities vary based on the mechanism of polymerization and can be affected by a variety of reaction conditions such as reactant ratios, how close the polymerization went to completion, etc. In one embodiment, the polyvinylpyrrolidone used herein has a PDI of up to 6, preferably up to 5, preferably up to 3, preferably up to 2.5, preferably up to 2, preferably up to 1.5, preferably up to 1.25. As used herein, a degree of polymerization (DP) is defined as the number of monomeric units in a macromolecule or polymer. In one embodiment, the polyvinylpyrollidone used herein has a degree of polymerization of 50-5000, preferably 100-2500, preferably 100-1500, preferably 100-750, preferably 100-300.

In a preferred embodiment, 1-40 g of polyvinylpyrrolidone is present per liter of the reaction mixture, preferably 5-35 g/L, preferably 10-30 g/L, preferably 15-25 g/L, preferably 18-22 g/L, or about 20 g of polyvinylpyrrolidone is present per liter of the reaction mixture.

In one or more embodiments, the reaction mixture is heated at a temperature of 100-300° C., preferably 120-280° C., preferably 140-260° C., preferably 160-240° C., preferably 175-225° C., preferably 180-220° C. In a preferred embodiment, the reaction mixture is heated at a temperature of 180-220° C., preferably 182-218° C., preferably 184-216° C., preferably 186-214° C., preferably 188-212° C., preferably 190-210° C., preferably 192-208° C., preferably 194-206° C., preferably 196-204° C., preferably 198-202° C., or about 200° C. In one or more embodiments, the reaction mixture is heated for a time period of 1-60 hours, preferably 2-48 hours, preferably 4-44 hours, preferably 8-40 hours, preferably 10-36 hours, preferably 12-32 hours, preferably 16-28 hours. In a preferred embodiment, the reaction mixture is heated for a time period of 16-28 hours, preferably 17-27 hours, preferably 18-26 hours, preferably 19-25 hours, preferably 19.5-24.5 hours, or about 24 hours. In certain embodiments, the reaction mixture may be stirred (e.g. at a speed of 50-1000 rpm, 50-900 rpm, 50-700 rpm, 50-500 rpm, 100-500 rpm, or 200-400 rpm), or in certain embodiments the reaction mixture may be left to stand or not agitated during the heating.

The heating may be preferably conducted in an autoclave, more preferably a Teflon lined autoclave. After heating, the autoclave may be left to cool to a temperature in a range of 10-40° C., preferably 10-30° C., preferably 20-30° C. The $Bi_2S_3$—CdS particles may be collected/washed/dried by methods commonly known to those of ordinary skill in the art. For example, the $Bi_2S_3$—CdS particles may be collected by filtering and/or centrifugation, washed one or more times with solvents such as water and ethanol and dried in an oven or ambient conditions at a temperature in a range of 40-100° C., preferably 45-90° C., preferably 50-80° C., preferably 55-70° C. for a time period of 1-48 hours, preferably 6-36 hours, preferably 10-30 hours, preferably 20-28 hours, preferably 22-26 hours.

Another aspect of the present disclosure relates to method for degrading an organic pollutant using $Bi_2S_3$—CdS particles. Preferably, these $Bi_2S_3$—CdS particles comprise bismuth(III) sulfide and cadmium(II) sulfide, and are in the form of spheres, with composition ratios, and structural dimensions as described previously. The $Bi_2S_3$—CdS particles may have similar properties as described for those in the first aspect, such as average particle diameter, surface area, pore size, pore volume, and/or some other property. In preferred embodiments, the $Bi_2S_3$—CdS particles used herein for degrading the organic pollutant have aforementioned atomic ratios of bismuth to cadmium, sulfur to bismuth, and sulfur to cadmium, shapes, average diameters, BET surface areas, pore volumes, and average pore sizes.

The method for degrading an organic pollutant using $Bi_2S_3$—CdS particles involves (i) contacting the $Bi_2S_3$—CdS particles with an aqueous solution comprising the organic pollutant to form a mixture, and (ii) illuminating the mixture with a light at a wavelength in a range of 200-700 nm, 250-600 nm, 300-500 nm, or 320-400 nm for 0.1-6 hours, 0.5-5 hours, 1-4 hours, or 2-3 hours, thereby degrading the organic pollutant. As used herein, the term degrading or "degradation" refers to breaking down the organic pollutant into atoms, ions, and/or smaller molecular fractions (e.g., nitrogen gas, carbon dioxide, water). Degradation of an organic pollutant involves breaking existing chemical bonds in the molecular structure of the organic pollutant so as to change the physical, chemical, and/or biological properties of the organic pollutant.

In one or more embodiments, an amount of the $Bi_2S_3$—CdS particles in the mixture is in a range of 0.1-10 g/L, 0.2-9 g/L, 0.3-8 g/L, 0.4-7 g/L, 0.5-6 g/L, 0.6-5 g/L, 0.7-4 g/L, 0.8-3 g/L, 0.9-2 g/L, or about 1 g/L relative to a total volume of the mixture. In certain embodiments, the $Bi_2S_3$—CdS particles are dispersed within the mixture, and may further be filtered and/or recycled after the degradation. In one or more embodiments, before degrading occurs, the organic pollutant may be present in the aqueous solution at a concentration of 1-1,000 mg/L, 2-750 mg/L, 4-500 mg/L, 6-250 mg/L, 8-100 mg/L, 9-50 mg/L, or 10-25 mg/L relative to a total volume of the aqueous solution. Water present in the aqueous solution may be tap water, distilled water, doubly distilled water, deionized water, deionized distilled water, reverse osmosis water, or combinations thereof. Non-limiting examples of aqueous solutions (i.e. organic pollutants contaminated aqueous solutions), water sources and systems include surface water that collects on the ground or in a stream, aquifer, river, lake, reservoir or ocean, ground water that is obtained by drilling wells, run-off, industrial water, industrial textile wastewater, public water storage towers, public recreational pools and/or bottled water.

The method may be carried out in tanks, containers, or small scale applications in both batch mode and continuous process. To limit or prevent evaporation, the mixture may be in a sealed vessel or some other container, preferably with a transparent window. The vessel may comprise glass, quartz, or a polymeric material transparent to ultraviolet light and chemically stable with the mixture. As defined herein, "transparent" refers to an optical quality of a compound wherein a certain wavelength or range of wavelengths of light may traverse through a portion of the compound with a small loss of light intensity. A material that causes a loss of less than 25%, preferably less than 20%, preferably less than 10%, preferably less than 5%, preferably less than 2% of the intensity of a certain wavelength or range of wavelengths of light may be considered transparent.

The illumination source may be any known light source including, but not limited to, natural solar sunlight, UV light, laser light, incandescent light, and the like. Exemplary light sources include, but are not limited to, a xenon lamp, a mercurial lamp, a metal halide lamp, an LED lamp, a solar simulator, and a halogen lamp. Preferably the light source is a xenon lamp including, but not limited to, a xenon arc lamp or a xenon flash lamp. Two or more light sources nay be used. In certain embodiments, sunlight may be used as the light source. In a preferred embodiment, the mixture is illuminated with light having a wavelength of 200-700 nm, 250-600 nm, 300-500 nm, or 320-400 nm. The illumination source may have a total power output of 50-1,000 W, preferably 100-750 W, more preferably 200-500 W, and may be positioned 1-50 cm, 5-40 cm, 10-30 cm, or 15-20 cm from the closest surface of the mixture. The mixture may be illuminated for a time period of 5-720 minutes, preferably 15-600 minutes, preferably 30-480 minutes, preferably 45-360 minutes, preferably 60-240 minutes, preferably 90-180 minutes.

The mixture may be shaken, stirred, or agitated throughout the duration of the degradation by employing a rotary shake, a magnetic stirrer, or an overhead stirrer. In another embodiment, the mixture is left to stand (i.e. not agitated). In one embodiment, the mixture is sonicated. The degradation may be performed at a temperature in a range of 10-70° C., 12-60° C., 15-50° C., 18-40° C., 20-35° C., or 25-30° C. The mixture may be temperature regulated to prevent overheating and/or evaporation, for example, via a water tubing, a water and/or ice bath, ice packs, or air cooling. In one embodiment, the degradation method is performed at a pressure in a range of 0.5-2 atm, 0.7-1.8 atm, 0.8-1.5 atm, or preferably 0.9-1.2 atm.

The $Bi_2S_3$—CdS particles may be used to photodegrade organic dyes. Exemplary organic dyes that may be degraded by the method disclosed herein using the $Bi_2S_3$—CdS particles include, but are not limited to, methyl green, methylene blue, malachite green, brilliant green, brilliant blue FCF, new methylene blue, methyl blue, methyl purple, thymol blue, rhodamine B, methyl violet 2B, methyl violet 6B, crystal violet, phenol red, acid green 5, basic fuchsin, acid fuchsin, patent blue V, pararosaniline, Victoria blue B, Victoria blue FBR, Victoria blue BO, Victoria blue FGA, Victoria blue 4 R, Victoria blue R, and azo dyes such as methyl orange, methyl red, methyl yellow, Congo red, direct blue 1, basic red 18, direct brown 78, trypan blue, disperse orange 1, alizarine yellow R, Sudan III, Sudan IV, Sudan black B, and orange G. In at least one embodiment, the organic pollutant comprises methyl orange, methyl green, or both. The method disclosed herein may degrade one or more organic dyes present as the organic pollutant in the mixture.

Other organic pollutants that may be degraded by the method disclosed herein using the $Bi_2S_3$—CdS particles include, but are not limited to, organic pesticides such as aldrin, chlordane, DDT, dieldrin, endrin, heptachlor, hexachlorobenzene, mirex, and toxaphene, herbicides such as glyphosate, 2-methyl-4-chloropherioxyacetic acid, 2,4-dichlorophenoxyacetic acid, and 2,4,5-trichloropherioxyacetic acid, industrial chemicals such as hexachlorobenzene, polychlorinated biphenyls (PCBs), and methyl tertiary butyl ether.

Figure 4:
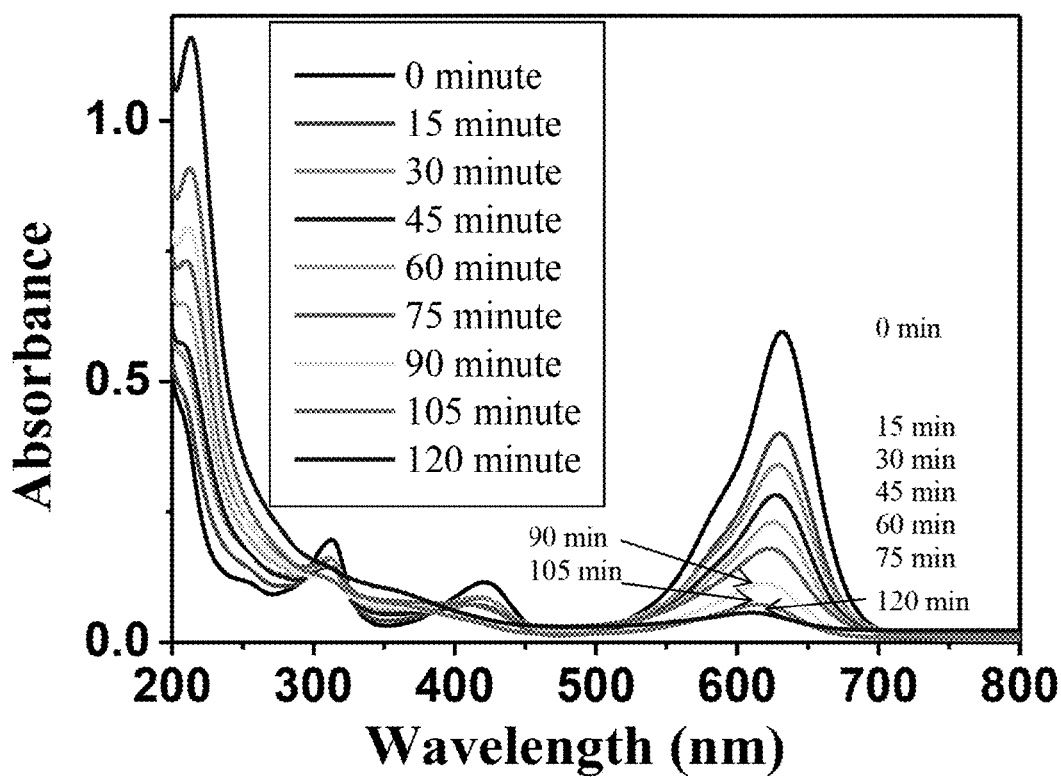
FIG. 4 shows changes in UV-vis absorption spectra demonstrating degradation of methyl green in the presence of $Bi_2S_3$—CdS nanospheres under different irradiation times.
Figure 5:
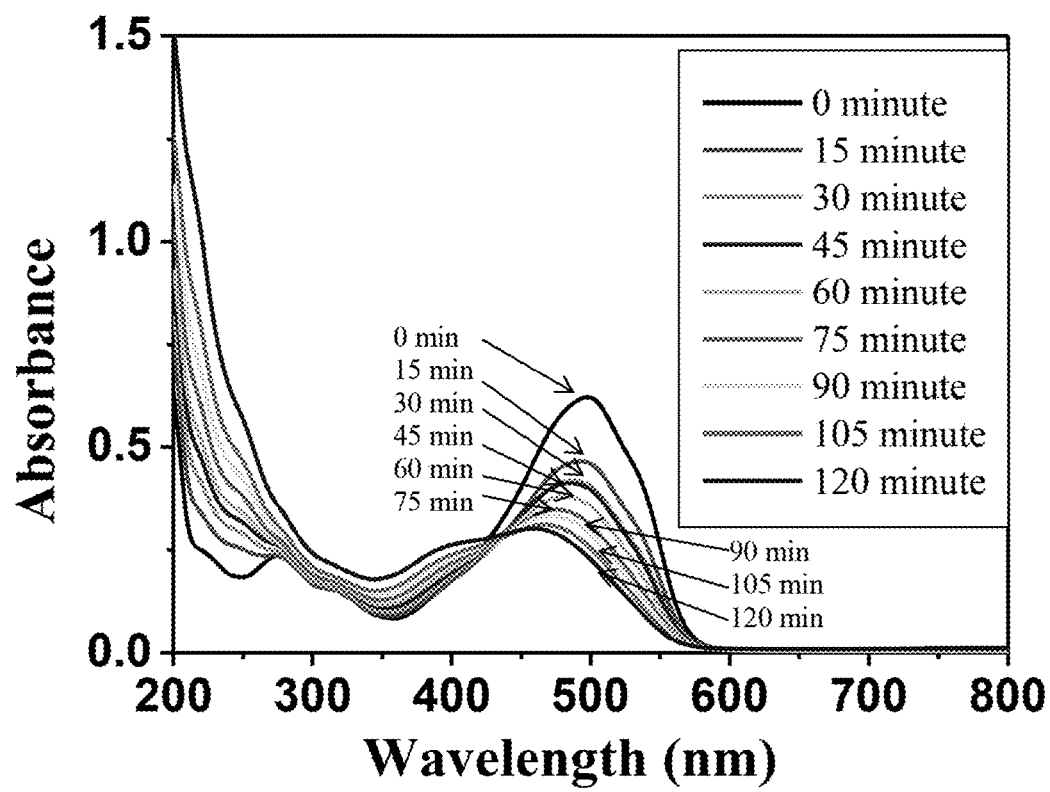
FIG. 5 shows changes in UV-vis absorption spectra demonstrating degradation of methyl orange in the presence of $Bi_2S_3$—CdS nanospheres under different irradiation times.

The reduction in the concentration of the organic pollutants in the mixture may be monitored by UV-vis spectroscopy (see FIGS. 4 and 5), high-pressure liquid chromatography (HPLC), liquid chromatography-mass spectrometry (LC-MS), and nuclear magnetic resonance (NMR) spectroscopy. In one or more embodiments, at least 10%, at least 20%, at least 25%, or at least 30% by mole of the organic pollutant in the mixture is degraded within 5 minutes, within 10 minutes, within 15 minutes, within 30 minutes, within 45 minutes, within 60 minutes, within 75 minutes, within 90 minutes, within 105 minutes, or within 120 minutes of illuminating. In one embodiment, when methyl green is present as the organic pollutant, at least 50%, at least 60%, at least 70%, at least 80%, at least 90%, at least 95%, or at least 98% by mole of the methyl green is degraded within 30 minutes, within 45 minutes, within 60 minutes, within 75 minutes, within 90 minutes, within 105 minutes, or within 120 minutes of illuminating (see FIGS. 4 and 6). In another embodiment, when methyl orange is present as the organic pollutant, at least 20%, at least 25%, at least 30%, at least 35%, or at least 40% by mole of the methyl orange is degraded within 30 minutes, within 45 minutes, within 60 minutes, within 75 minutes, within 90 minutes, within 105 minutes, or within 120 minutes of illuminating (see FIGS. 5 and 6).

Another aspect of the present disclosure relates to a method for preventing or reducing growth of a microorganism on a surface using $Bi_2S_3$—CdS particles. Preferably, these $Bi_2S_3$—CdS particles comprise bismuth(III) sulfide and cadmium(II) sulfide, and are in the form of spheres, with composition ratios and structural dimensions as described previously. The $Bi_2S_3$—CdS particles may have similar properties as described for those in the first aspect, such as average particle diameter, surface area, pore size, pore volume, and/or some other property. In preferred embodiments, the $Bi_2S_3$—CdS particles used herein for preventing or reducing growth of a microorganism on a surface have aforementioned atomic ratios of bismuth to cadmium, sulfur to bismuth, and sulfur to cadmium, shapes, average diameters, BET surface areas, pore volumes and average pore sizes.

In other embodiments, the $Bi_2S_3$—CdS particles having one or more dissimilar properties as compared to those described in the first aspect may be used herein for preventing or reducing growth of a microorganism on a surface. For example, $Bi_2S_3$—CdS particles may be used which have an average diameter smaller than 0.3 μm or greater than 5 μm. Alternatively, $Bi_2S_3$—CdS particles may be used which have a BET surface area smaller than 1 $m^2/g$ or greater than 50 $m^2/g$, a pore volume smaller than 0.02 $cm^3/g$ or greater than 0.4 $cm^3/g$, and/or an average pore size smaller than 4 nm or greater than 50 nm. These $Bi_2S_3$—CdS particles with dissimilar properties may be prepared by using starting materials, such as bismuth(III) salt, cadmium(II) salt, or optionally substituted thiourea, that are at different concentrations than those described previously. Alternatively, these $Bi_2S_3$—CdS particles with dissimilar properties may be formed by changing the aforementioned reaction conditions, such as reaction time, and/or temperature.

The method for preventing or reducing growth of a microorganism on a surface using $Bi_2S_3$—CdS particles involves applying the $Bi_2S_3$—CdS particles onto the surface. Preferably, the $Bi_2S_3$—CdS particles are in contact with the surface for 0.5-48 hours, 1-24 hours, 2-12 hours, or 3-6 hours.

In one or inure embodiments, the $Bi_2S_3$—CdS particles are applied onto the surface as a mixture (e.g. a solution, a suspension) comprising the $Bi_2S_3$—CdS particles. Preferably, the $Bi_2S_3$—CdS particles are applied onto the surface as a solution comprising a solvent and the $Bi_2S_3$—CdS particles. The solution may comprise 1 μg/mL to 50 mg/mL of the $Bi_2S_3$—CdS particles relative to a total volume of the solution, preferably 2 μg/mL to 40 mg/mL, preferably 4 μg/mL to 30 mg/mL, preferably 6 μg/mL to 20 mg/mL, preferably 8 μg/mL to 10 mg/mL, preferably 10 μg/mL to 8 mg/mL, preferably 50 μg/mL to 6 mg/mL, preferably 100 μg/mL to 4 mg/mL, preferably 200 μg/mL to 3 mg/mL, preferably 300 mg/mL, to 2 mg/mL, preferably 400 μg/mL to 1.5 mg/mL, preferably 500 μg/mL to 1 mg/mL. In one or more embodiments, the solvent comprises dimethyl sulfoxide (DMSO), water, or both. Preferably, the solvent comprises DMSO and water and DMSO is present at a volume concentration of 0.1-10 vol %, 0.5-9 vol %, 1-8 vol %, 2-7 vol %, 3-6 vol %, or 4-5 vol % relative to a total volume of the solvent. The solution may further comprise other compatible solvents such as ethanol, and isopropyl alcohol.

As used herein, "microoraanism" or "microbe" refers to in particular fungi, and gram-positive and gram-negative bacteria. The term "antimicrobial product" refers to a product demonstrating the capability to inhibit or prevent the proliferation of microorganisms. Gram-negative bacteria are bacteria that do not retain the crystal violet stain used in the gram-staining method of bacterial differentiation.

In one or more embodiments, the $Bi_2S_3$—CdS particles are applied onto the surface as an antimicrobial product containing the $Bi_2S_3$—CdS particles at an amount of 0.01-99 wt %, 0.5-95 wt %, 1-90 wt %, 2-80 wt %, 5-70 wt %, 10-60 wt %, 20-50 wt %, 30-40 wt % relative to a total weight of the antibacterial product.

Exemplary antimicrobial products include, but are not limited to, antimicrobial coatings, hand sanitizer (including rinse off and leave-on and aqueous-based hand disinfectants), preoperative skin disinfectant, bar soap, liquid soap (e.g., hand soap), hospital disinfectants, disinfecting spray solution, household cleansing wipes, surface sanitizer, personal care disinfecting wipes, body wash, acne treatment products, antibacterial diaper rash cream, antibacterial skin cream, deodorant, antimicrobial creams, topical cream, a wound care item, such as wound healing ointments, creams, and lotions.

The method disclosed herein may be used to prevent or reduce growth of a microorganism on the skin of a subject. In a preferred embodiment, the $Bi_2S_3$—CdS particles are applied onto the skin of a subject as an antimicrobial cream comprising 0.01-50 wt %, 0.1-40 wt %, 1-30 wt %, 2-20 wt %, 4-15 wt %, or 5-10 wt % of the $Bi_2S_3$—CdS particles relative to a total weight of the antimicrobial cream. The subject may be a mammal, such as a human; a non-human primate, such as a chimpanzee, and other apes and monkey species; a farm animal, such as a cow, a horse, a sheep, a goat, and a pig; a domestic animal, such as a rabbit, a dog, and a cat; a laboratory animal including a rodent, such as a rat, a mouse, and a guinea pig, and the like. The antimicrobial cream may further comprise other formulating components such as occlusion components (e.g. petrolatum), film forming agents (e.g. polyvinylpyrrolidone), thickening agents (e.g. xanthan gum, polyacrylamide polymers), and/or emulsifiers (e.g. fatty acids, fatty alcohols). The formulation techniques of topical creams are generally known to those skilled in the art.

The method disclosed herein may also be used to prevent or reduce growth of a microorganism on the surface of an artificial restoration or medical device. Exemplary artificial restorations include, without limitation, dental restorations, dentures, dental implants, craniofacial implants, artificial joints, and artificial bones. Exemplary medical devices include, but are not limited to, catheters, medical diagnosis instruments such as endoscopes, contact lenses, spectacles, hearing aids, and mouth guards.

Other surfaces suitable for the method disclosed herein include both hard and soft surfaces. The term "hard surface" includes, but is not limited to, bathroom surfaces (tub and tile, fixtures, ceramics), kitchen surfaces, countertops, appliances, flooring, glass, automobiles, and the like. "Soft surfaces" include but are not limited to fabrics, leather, carpets, furniture, upholstery and other suitable soft surfaces. The presently disclosed method may be particularly viable for sanitizing surfaces related to hospital and nursing care facilities and equipment such as hospital room, toilet, beds, sheets, pillows, wheelchairs, and canes.

The $Bi_2S_3$—CdS particles may be applied onto a desired area of the surface as needed. In certain embodiments, the method disclosed herein involves applying the $Bi_2S_3$—CdS particles onto the surface 1 to 10 times daily, preferably 2 to 7 times daily, preferably 3 to 5 times daily. In some embodiments, the interval of time between each application of the $Bi_2S_3$—CdS particles may be about 1-5 minutes, 1-30 minutes, 30 minutes to 60 minutes, 1 hour, 1-2 hours, 2-6 hours, 2-12 hours, 12-24 hours, 1-2 days, 2 days, 3 days, 4 days, 5 days, 6 days, 7 days, 1 week, 2 weeks, 3 weeks, 4 weeks, 5 weeks, 6 weeks, 7 weeks, 8 weeks, 9 weeks, 10 weeks, 15 weeks, 20 weeks, 26 weeks, 52 weeks, 11-15 weeks, 15-20 weeks, 20-30 weeks, 30-40 weeks, 40-50 weeks, 1 month, 2 months, 3 months, 4 months, 5 months, 6 months, 7 months, 8 months, 9 months, 10 months, 11 months, 12 months, 1 year, 2 years, or any period of time in between.

In one or more embodiments, the aforementioned method in any of its embodiments may prevent or reduce growth of a gram-negative bacterium which is at least one selected From the group consisting of *Acinetobacter baumannii, Enterobacter aerogenes, Escherchia coli, Klebsiella oxytoca,* and *Klebsiella pneumoniae.*

*Acinetobacter baumannii* (*A. baumannii*) is an almost round, rod-shaped gram-negative bacterium which can be an opportunistic pathogen in humans, affecting people with compromised immune systems, and is becoming a major cause to hospital-derived infections (nosocomial infections) in medical facilities. *Enterobacter aerogenes* (*E. aerogenes*, also known as *Klebsiella aerogenes*), is a rod-shaped, gram-negative bacterium. *E. aerogenes* a nosocomial and pathogenic bacterium that causes infections and the treatment of *E. aerogenes* caused infection is often complicated by their inducible antibiotic resistance mechanisms. Pathogenic strains of *Escherchia coli* (*E. coli*) can cause gastroenteritis, urinary tract infections, neonatal meningitis hemorrhagic colitis, and Crohn's disease. Common signs and symptoms include severe abdominal cramps, diarrhea, hemorrhagic colitis, vomiting, and sometimes fever. *Klebsiella oxytoca* (*K. oxytoca*) is a gram-negative, rod-shaped bacterium that nay cause colitis and sepsis. *K. oxytoca* is capable of acquiring antibiotic resistance. *Klebsiella pneumoniae* (*K. pneumoniae*) is a gram-negative, rod-shaped bacterium closely related to *K. oxytoca.*

The method disclosed herein in any of its embodiments may be effective on other pathogenic gram-negative bacteria including, but not limited to, *Klebsiella granulomatis, Klebsiella variicola, Acinetobacter calcoaceticus, Acinetobacter calistiniresistens, Acinetobacter defluvii, Acinetobacter haemolyticus, Acinetobacter junii, Acinetobacter lwoffii, Acinetobacter pitii, Acinetobacter schindleri, Acinetobacter soli, Pseudomonas aeruginosa, Neisseria meningitidis, Neisseria gonorrhoeae, Pseudomonas pseudomallei, Treponema pallidum, Mycobacterium tuberculosis, Salmonella* spec., alpha-Proteobacteria (particularly *Agrobacterium* spec.), beta-Proteobacteria (particularly *Nitrosomonas* spec.), *Aquabacterium* spec., Gammaproteobacteria, *Stenotrophomonas* spec. (particularly *S. maltophilia*), *Xanthomonas* spec. (*X. campestris*), *Neisseria* spec., and *Haemophilus* spec.

In one or more embodiments, the aforementioned method in any of its embodiments may prevent or reduce growth of a gram-positive bacterium which is at least one selected from the group consisting of *Staphylococcus aureus, Staphylococcus epidermis,* and MRSA.

*Staphylococcus aureus* (*S. aureus*) is a grain-positive, round-shaped bacterium which is a corn cause of skin infections, atopic dermatitis, bone and joint infections including infections from joint replacement surgeries, and other medical devices implanted in the body or on human tissue. *Staphylococcus epidermidis* (*S. epidermidis*) is a gram-positive bacterium, which is known for its ability to form biofilms that grow on medical devices and surgical implants. MRSA, known as methicillin-resistant *Staphylococcus aureus*, refers to a group of gram-positive bacteria that are genetically distinct from other strains of *Staphylococcus aureus*. MRSA is any strain of *S. aureus* that has developed multiple drug resistance to beta-lactam antibiotics, through horizontal gene transfer and natural selection. Treatment of MRSA can be challenging and delays are often fatal.

The method disclosed herein in any of its embodiments may be effective on other pathogenic gram-positive bacteria including, but not limited to, *Staphylococcus auricularis, Staphylococcus capitis, Staphylococcus caprae, Staphylococcus cohnii, Staphylococcus delphini, Staphylococcus felis, Staphylococcus gallinarum, Staphylococcus haemolyticus, Staphylococcus hominis, Staphylococcus hyicus, Staphylococcus lugdunensis, Staphylococcus pettenkoferi, Staphylococcus pseudintermedius, Staphylococcus rostri, Staphylococcus saccharolyticus, Staphylococcus saprophyticus, Staphylococci schleiferi, Staphylococcus vitulinus, Staphylococcus warneri, Staphylococcus xylosus, Streptococcus pyogenes Corynebactertum* spp. (particularly *C. tenuis, C. diphtheriae*, and *C. minutissimum*), *Micrococcus* spp. (particularly *M. sedentarius*), *Bacillus anthracis, Streptococcus* spec. (particularly *S. gordonii*, and *S. mutans*), *Actinomyces* spec. (particularly *A. naeslundii*), and *Actinobacteria* (particularly *Brachybacterium* spec.).

In certain embodiments, preventing or reducing growth of a microorganism on the surface may be evaluated by measuring microbial counts of the surface before and/or at least 30 minutes, preferably at least 1 hour, more preferably at least 2 hours after applying the surface with the $Bi_2S_3$—CdS particles via the method described herein in any of its embodiments. For example, the number of viable microorganisms is counted using a slide count method and/or a direct culture method (plate count).

The "slide count" method utilizes a microscope slide in a chamber that is especially designed to enable cell counting. A total number of cells in a sample can be determined by looking at the sample under a microscope and counting the number manually. A number of viable cells can also be determined using the slide count method if a viability dye is added to the sample. Exemplary viability dyes include, but are not limited to, Trypan Blue, Calcein-AM, Erythrosine B, propidium iodide, and 7-aminoactinomycin D.

"Colony-forming unit (CFU)" refers to a unit used to estimate the number of viable bacteria or fungal cells in a sample. The purpose of direct culture method (plate count) is to estimate the number of cells present based on their ability to give rise to colonies under specific conditions of nutrient medium, temperature and time. Theoretically, one viable cell can give rise to a colony through replication. A sample solution of microbes at an unknown concentration is often serially diluted in order to obtain at least one plate with a countable number of CFUs. Counting colonies is performed manually using a pen and a click-counter, or automatically using an automated system and a software tool for counting CFUs.

In other embodiments, preventing or reducing growth of a microorganism on a surface may be evaluated by conducting disk diffusion tests of the surface before and/or at least 30 minutes, preferably at least 1 hour, more preferably at least 2 hours after applying the surface with the $Bi_2S_3$—CdS particles via the method described herein in any of its embodiments.

The disk diffusion method (or agar diffusion test, or Kirby-Bauer test) evaluates the effectiveness of antibiotics on a specific microorganism by testing the extent to which bacteria are affected by those antibiotics. In this test, samples containing antibiotics are placed on an agar plate where bacteria have been placed, and the plate is left to incubate. If an antibiotic stops the bacteria from growing or kills the bacteria, there will be an area around the sample where the bacteria have not grown enough to be visible. This is called a zone of inhibition. Thus, the effectiveness of antibiotics can be measured using their zone of inhibition.

Preventing or reducing growth of a microorganism on a surface may be understood to indicate a reduction of the number of microorganism cells on the surface after applying the $Bi_2S_3$—CdS particles onto the surface. In some embodiments, the number of microorganisms on the surface characterized by a microbial count is reduced by at least 10%, preferably at least 20%, more preferably at least 30%, more preferably at least 40%, more preferably at least 45%, more preferably at least 50%, more preferably at least 55%, more preferably at least 60%, more preferably at least 65%, more preferably at least 70%, more preferably at least 80%, more preferably at least 90%, or more preferably at least 95%, with respect to use of an untreated control surface. Ideally, the growth of microorganisms on the surface may be completely or almost completely prevented.

Alternatively, preventing or reducing growth of a microorganism on a surface may be understood to indicate an increase of the size of zone of inhibition on the surface after applying the $Bi_2S_3$—CdS particles onto the surface. In some embodiments, the zone of inhibition of aforementioned one or more microorganisms on the surface is increased by at least 50%, preferably at least 75%, more preferably at least 100%, more preferably at least 150%, more preferably at least 200%, more preferably at least 250%, more preferably at least 300%, more preferably at least 350%, more preferably at least 400%, more preferably at least 450%, more preferably at least 500%, more preferably at least 600%, or more preferably at least 800%, with respect to use of an untreated control surface.

The examples below are intended to further illustrate protocols for preparing, characterizing $Bi_2S_3$—CdS particles, and uses thereof, and are not intended to limit the scope of the claims.

Example 1

Preparation of $Bi_2S_3$—CdS Nanospheres

All chemicals used were purchased from commercial sources. 0.243 g of bismuth nitrate ($Bi(NO_3)_3.5H_2O$) and 0.291 g cadmium nitrate ($Cd(NO_3)_2.4H_2O$) was weighed and transferred into a teflon lined vial, and 20 mL of ethylene glycol was added to this mixture, which was followed by addition of thiourea (0.228 g) and polyvinylpyrrolidone (PVP, 0.4 g). The reaction mixture was stirred at room temperature for 15-20 minutes Teflon lined vial was closed in teflon lined autoclave and the mixture was heated at 200° C. for 24 hours. The flask was cooled to room temperature and the precipitate was centrifuged, washed with deionized water and then with ethanol. The product was dried in the oven for 24 hours at 60° C.

Example 2

Characterizations of $Bi_2S_3$—CdS Nanospheres

The morphologies of $Bi_2S_3$—CdS nanospheres were examined by scanning electron microscopy (SEM, FEI INSPECT S50). The crystallinity and crystal phases of as-synthesized $Bi_2S_3$—CdS were studied by X-ray diffractometer (XRD Rigaku, Japan) measured with Cu-Kα radiation ($\lambda$=1.5418 Å) in the range of 10-80° with 1°/min scanning speed. UV-Vis diffuse reflectance spectrum of Bi$_2$S$_3$—CdS was recorded on a diffuse reflectance UV-Vis spectrophotometer (JASCO V-750). Micromeritics ASAP 2020 PLUS nitrogen adsorption apparatus (USA) was employed for BET surface area determination. Before analysis, samples were degassed at 180° C. Surface area was determined using N$_2$ adsorption data in the relative pressure (P/P$_0$) range of 0.05-0.3.

Example 3

Photocatalytic Activity

Figure 6:
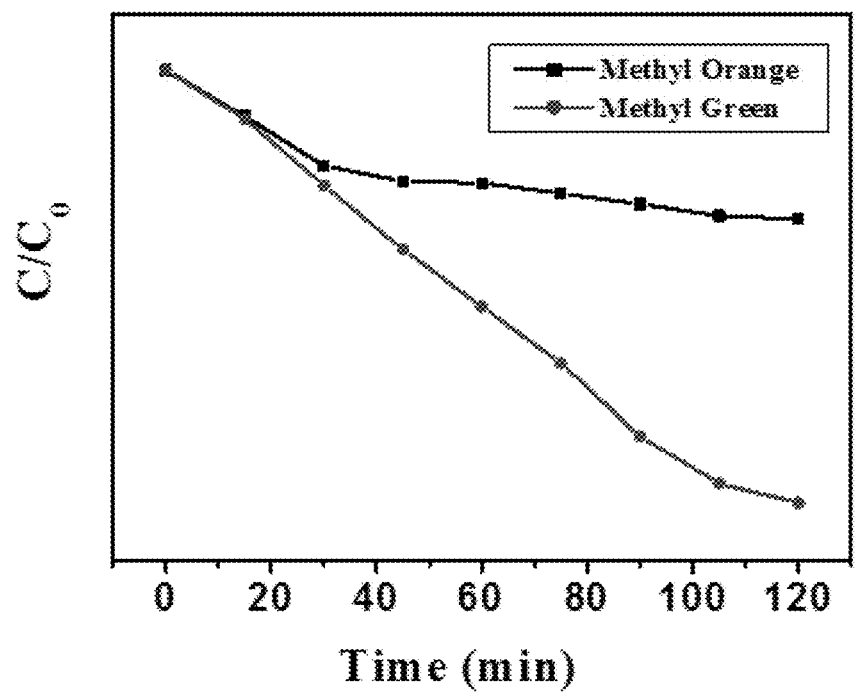
FIG. 6 is a graph showing the photocatalytic activities of $Bi_2S_3$—CdS nanospheres degrading methyl green and methyl orange over a period of 120 min.
Figure 7:
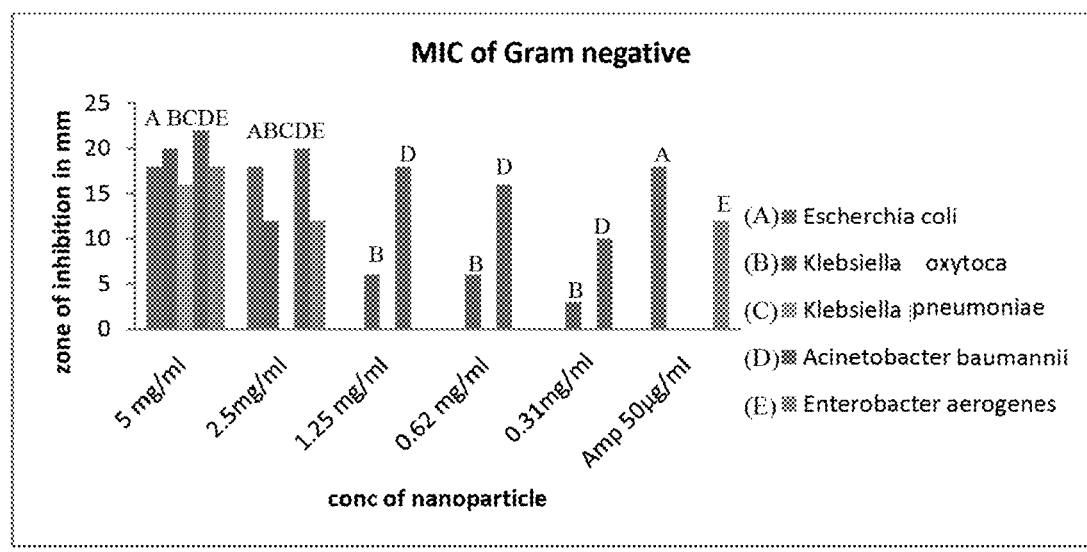
FIG. 7 is a bar graph showing antibacterial activities represented by zone of inhibition of $Bi_2S_3$—CdS nanospheres at various concentrations against gram-negative bacteria.
Figure 8:
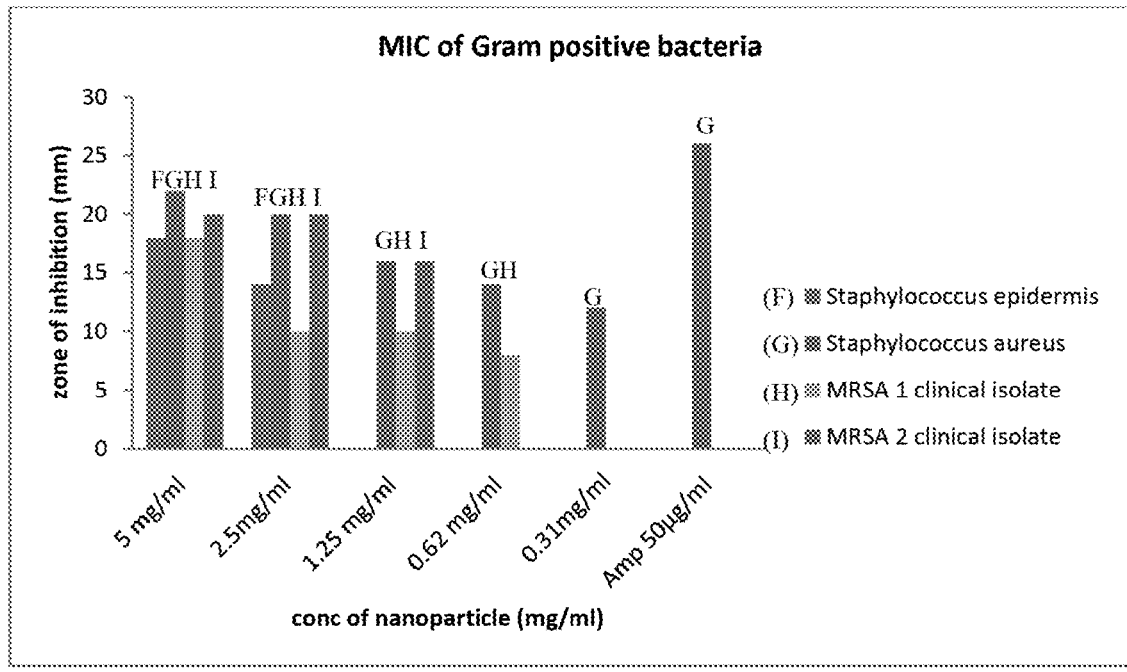
FIG. 8 is a bar graph showing antibacterial activities represented by zone of inhibition of $Bi_2S_3$—CdS nanospheres at various concentrations against gram-positive bacteria.
Figure 9:
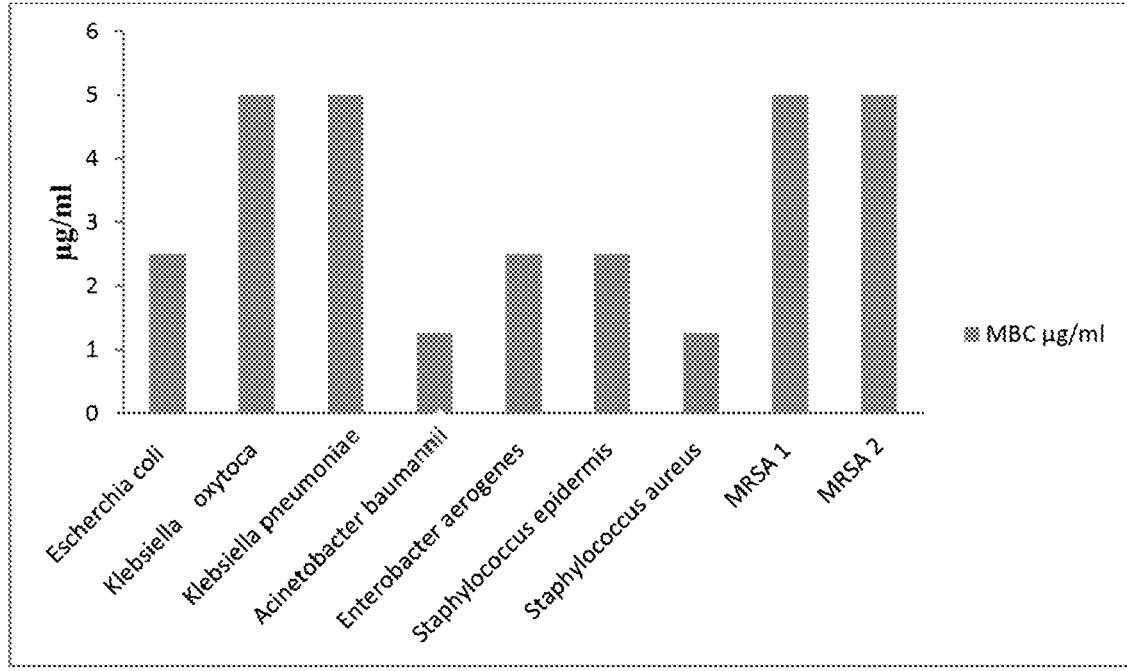
FIG. 9 is a bar graph showing minimum bactericidal concentrations (MBCs) of $Bi_2S_3$—CdS nanospheres over gram-negative and gram-positive bacteria strains.

The photocatalytic activity of Bi$_2$S$_3$—CdS was evaluated through photocatalytic degradation of methyl orange and methyl green under UV light irradiation for 120 min using Xenon lamp (300 W) as light source. In each experiment (carried out separately for each dye) 50 mg of Bi$_2$S$_3$—CdS was dispersed in 50 mL of aqueous dye solution of methyl orange (10 mg/L) or methyl green (14 mg/L). In order to ensure the adsorption-desorption equilibrium between the photocatalyst and dye, solution was stirred in dark for 1 hour and then illuminated under Xenon lamp (300 W). After 15 min time interval, 4 mL of the suspension was collected and centrifuged to remove Bi$_2$S$_3$—CdS catalyst. The concentration of dye was assessed using a UV-Visible spectrophotometer (JASCO V-750) by measuring the absorbance of dyes at their respective wavelength. The degradation efficiency was calculated as:

$$\text{Degradation rate (\%)} = (C_0 - C)/C_0 \times 100 \quad \text{(equation 1)}$$

where $C_0$ is the initial concentration of the methyl orange or methyl green and C is the time-dependent concentration of methyl orange or methyl green after each irradiation (see FIG. 6).

Example 4

Antibacterial Activity Test

Gram positive and Gram negative bacteria reference strains ATCC (American Type Culture Collection) were procured from Department of Microbiology, College of Science, IAU, Dammam, which included: *Escherchia coli* ATCC25922, *Klebsiella oxytoca* ATCC700324, *Klebsiella pneumoniae* ATCC100324, *Acinetobacter baumannii* ATCCmra747, *Enterobacter aerogenes* ATCC13048, *Staphylococcus epidermis* ATCC12228, *Staphylococcus aureus* ATCC24213, and MRSA 1 and MRSA 2 (clinical isolates). The strains were maintained on agar slants at 4° C. and activated at 37° C. for 24 h on nutrient agar prior to any test.

Example 5

Preparation of Bi$_2$S$_3$—CdS Nanomaterial

A known amount of Bi$_2$S$_3$—CdS nanomaterial was dissolved in 5% DMSO with continuous stirring to obtain a homogenized solution. The homogenized suspension was further diluted to obtain solutions each having concentrations of 0.31, 0.625, 1.25, 2.5, and 5 mg/mL Bi$_2$S$_3$—CdS, respectively.

Example 6

Inoculum Preparation

Test strains were grown overnight at 37° C. in Mueller Hinton Broth and the turbidity was adjusted to 0.5 McFarland units (approximately 10$^6$ colony forming units (CFUs)/mL).

Example 7

Zone Inhibition Method

100 μL of prepared inoculums of each reference strain was uniformly spread over fresh nutrient agar plates with a sterile spreader to achieve a confluent growth. Seven wells of 6 mm diameter were punched with the assistance of a sterile cork borer. 50 μL test solution of different concentrations was added in the wells of the inoculated agar plates for each test organism. DMSO was used as a negative control. Ampicillin at a concentration of 30 μg/mL was used as a positive control. The plates were allowed to stand for 1 h at room temperature for diffusion of the test solution into agar and incubated at 37° C. for 24 h. Clear zone of inhibition around each well was measured. Each experiment was performed in triplicates.

Example 8

Determination of Minimal Bactericidal Concentrations (MBCs)

MBC (Minimum Bactericidal Concentration) for Bi$_2$S$_3$—CdS nanomaterial was also evaluated by the micro-broth dilution method. Both gram negative and positive bacterial strains were used in this test. Control experiments were carried out in presence of ampicillin and in absence of Bi$_2$S$_3$—CdS nanomaterial as positive and negative controls, respectively. In general, 10 mL nutrient broth medium supplemented with Bi$_2$S$_3$—CdS nanomaterial at concentrations of 0.31, 0.625, 1.25, 2.5, and 5 mg/mL was prepared separately. Each set was inoculated with 100 μL of overnight bacterial suspension (10$^6$ CFU/mL) and were incubated for 24 hours with shaking at 35° C.±2° C. After overnight incubation, 10 μL of each set was streaked out on a nutrient agar plate and further incubated at 35° C.±2° C. for 24 hours. Viable bacterial colonies were counted and recorded by the naked eye to determine the MBC as the lowest concentration that blocked bacterial growth. The experiments were carried out in triplicate, and averages were reported.

Example 9

Bi$_2$S$_3$—CdS nanospheres were prepared by solvothermal method. The prepared Bi$_2$S$_3$—CdS nanoparticles were characterized by X-ray powder diffraction (XRD), scanning electron microscope (SEM), UV-Vis diffuse reflectance spectrophotometer, and BET surface area analysis. The BET surface area of Bi$_2$S$_3$—CdS nanospheres was determined to be 11.29 m$^2$/g (pore size: 23.69 nm; pore volume: 0.0683 cm$^3$/g). The potential application of Bi$_2$S$_3$—CdS nanoparticles was evaluated for the photocatalytic degradation of environmental pollutants such as methyl orange, and methyl green. It was observed that nanoparticles exhibited good photocatalytic degradation of methyl orange and methyl green.

Additionally, antimicrobial activity of Bi$_2$S$_3$—CdS nanoparticles was evaluated, against Gram-positive and Gram-negative microorganisms. Antibacterial activity results revealed that the tested nanoparticles acted as an excellent antibacterial agent against both Gram-positive and Gram-negative bacteria. The concentration-dependency of antimicrobial activities of nanoparticles against Gram-negative bacteria was observed. Greater inhibition zone (22 mm) against *Acinetobacter baumannii* was achieved at the concentration of 5 mg/mL and zone of 8 mm at 0.31 mg/mL accompanied with MBC value of 1.25 mg/mL. The lowest activity was seen against *Klebsiella pneumoniae* with 16 mm zone of inhibition and MBC at the concentration of 5 mg/mL. The nanomaterial proved to be more effective on Gram-negative bacteria with respect to positive control (ampicillin at 50 µg/mL) to which many bacteria strains tested were resistant.

Amongst the Gram-positive strains, the nanomaterial was most effective against the *Staphylococcus aureus* with 22 mm zone of inhibition at the concentration of 5 mg/mL and 12 mm zone of inhibition at 0.31 mg/mL accompanied with MBC value of 1.25 mg/mL. The positive control (ampicillin 50 µg/mL) also showed 26 mm zone of inhibition. The nanomaterial also showed activities against *Staphylococcus epidermis* and MRSA isolates with considerable zone of inhibition as compared to the positive control (ampicillin 50 µg/mL), which was not active for these microorganisms.

Our results indicated that nanomaterials disclosed herein were effective against both Gram-positive and Gram-negative bacterial strains, hence offering an antimicrobial with a broad spectrum activity.

The invention claimed is:

1. A method for degrading an organic pollutant, the method comprising:
    contacting $Bi_2S_3$—CdS particles with an aqueous solution comprising the organic pollutant to form a mixture;
    illuminating the mixture with a light at a wavelength in a range of 200-700 nm for 0.1-6 hours thereby degrading the organic pollutant;
    wherein:
        the $Bi_2S_3$—CdS particles comprise bismuth(III) sulfide and cadmium(II) sulfide;
        the $Bi_2S_3$—CdS particles are in the form of spheres with an average diameter of 0.3-5 µm; and
        the organic pollutant is present in the aqueous solution at a concentration of 1-1,000 mg/L relative to a total volume of the aqueous solution.

2. The method of claim 1, wherein an atomic ratio of bismuth to cadmium in the $Bi_2S_3$—CdS particles is in a range of 0.5:1 to 4:1, and an atomic ratio of sulfur to bismuth in the $Bi_2S_3$—CdS particles is in a range of 3:2 to 8:1.

3. The method of claim 1, wherein the $Bi_2S_3$—CdS particles have a BET surface area of 5-25 $m^2/g$, a pore size of 10-50 nm, and a pore volume of 0.02-0.2 $cm^3/g$.

4. The method of claim 1, wherein an amount of the $Bi_2S_3$—CdS particles in the mixture is in a range of 0.1-10 g/L relative to a total volume of the mixture.

5. The method of claim 1, wherein at least 30% by mole of the organic pollutant is degraded within 2 hours of illuminating.

6. The method of claim 1, wherein the organic pollutant comprises methyl orange, methyl green, or both.

* * * * *